United States Patent
Miyaki et al.

[11] Patent Number: 5,927,413
[45] Date of Patent: Jul. 27, 1999

[54] CRAWLER BELT DRIVE APPARATUS FOR CRAWLER TYPE VEHICLES

[75] Inventors: Katsumi Miyaki; Hiroyuki Nishimori, both of Chiyoda-machi, Japan

[73] Assignee: Hitachi Construction Machinery Co., Ltd., Tokyo, Japan

[21] Appl. No.: 08/859,398

[22] Filed: May 20, 1997

[30] Foreign Application Priority Data

May 28, 1996 [JP] Japan .................................. 8-156109

[51] Int. Cl.⁶ .................................................. B62B 55/12
[52] U.S. Cl. .................................................. 180/9.62
[58] Field of Search .................... 180/6.7, 9.1, 9.36, 180/9.62, 9.64

[56] References Cited

FOREIGN PATENT DOCUMENTS 55-119281   8/1980   Japan .
61-183273  11/1985   Japan .

*Primary Examiner*—Robert J. Oberleitner
*Assistant Examiner*—Melanie Talavera
*Attorney, Agent, or Firm*—Antonelli, Terry, Stout & Kraus, LLP

[57] ABSTRACT

A crawler belt drive apparatus which can reduce meshing noises of drive sprocket and crawler belt in a reliable manner over a long period of time. An annular link guide member is provided on a housing of a reducer concentrically with the drive sprocket. As bushes of the respective track links of the crawler belt are meshed with the drive sprocket, the link guide member is held in sliding contact with inner end faces of the track links to maintain a clearance constantly between each bush and a bottom of the drive sprocket, thereby preventing the bushes from directly hitting against the bottom of the drive sprocket to suppress meshing noises or vibrations effectively.

4 Claims, 8 Drawing Sheets

CRAWLER BELT DRIVE APPARATUS FOR CRAWLER TYPE VEHICLES

BACKGROUND OF THE INVENTION

1. Field of the Invention

This invention relates to a crawler belt drive apparatus for use on crawler type vehicles, particularly suitable for use on construction machines which are equipped with endless crawler belts, for example, as hydraulic power shovels, hydraulic cranes and so forth.

2. Description of the Prior Art

Crawler type vehicles such as hydraulic power shovels and hydraulic cranes are normally equipped with a crawler type drive apparatus which suits for running on rough terrains of construction sites.

Drive apparatus for crawler type vehicles of this sort usually include a drive motor which is mounted on one longitudinal end of a vehicle frame, a power transmission mechanism which is coupled with an output shaft of the drive motor to transmit its rotation at a reduced speed, drive sprockets provided at one end of the vehicle frame on the side of the power transmission mechanism, idler wheels provided at the other longitudinal end of the vehicle frame, and crawler belts each wrapped between a drive sprocket and an idler wheel and constituted by a large number of track links which are connected into an endless form.

More specifically, each crawler belt is provided with a large number of track links in a couple of laterally spaced rows, cylindrical bushes provided between the laterally spaced rows of track links, and a large number of connecting pins fitted in the respective bushes and connecting the track links and the rows of track links to each other. Upon starting the drive motor which is coupled with the drive sprocket, the bushes of the crawler belt are successively meshed with the drive sprocket and the crawler belt is put in a crawling motion around the drive sprocket to put the vehicle in travel.

In this connection, as well known in the art, there has been a problem that large noises (meshing sounds or striking noises) are generated by the drive sprocket and bushes which hit against each other continuously or repeatedly as the bushes of the crawler belt are successively brought into meshing engagement with the drive sprocket.

In order to reduce or suppress such noises (meshing or striking noises) or vibrations of the crawler belt and drive sprocket, various attempts have thus far been made, for example, as described in Japanese Laid-Open Utility Model Applications 55-119281 and 61-183273 which use a rubber or similar buffer material for this purpose.

In the case of the above Japanese Laid-Open Utility Model Application 55-119281, the crawler belt is provided with rotatable buffer members of cylindrical shape between laterally spaced rows of endlessly connected track links alternately with connecting members, in such a way that, as the crawler belt is driven to turn around, the buffer members are brought into abutting engagement with the drive sprocket prior to the connecting members to reduce their striking noises.

On the other hand, in the case of the above Japanese Laid-Open Utility Model Application 61-183273, a plural number of buffer members with resilient pads of rubber or the like are provided in the proximity of sprocket teeth and circularly in the circumferential direction, so that they are abutted against upper and lower edges of the track links of the crawler belt at the time the connecting members are meshed with the drive sprocket, thereby to reduce the meshing noises or vibrations as generated by the meshing engagement with the drive sprocket of the connecting members of the track links.

However, above-described prior art arrangements which use either cylindrical buffer members for a large number of track links of the crawler belt or a plural number of buffer members in positions in the vicinity of sprocket teeth all around in the circumferential direction of the drive sprocket, still have a drawback that the provision of buffer members inevitably entails a substantial increase in cost due to increases in the number of parts and in the number of steps in assembling processes. Besides, the buffer members of rubber or similar material are susceptible to abrasive wear within a relatively short period of time and, therefore, are incapable of maintaining their effects over a long period of time in suppressing meshing noises or vibrations of the crawler belt.

SUMMARY OF THE INVENTION

In view of the above-mentioned drawbacks inherent to the prior art, it is an object of the present invention to provide a crawler belt drive apparatus for use on crawler type vehicles, employing simple muting means which can reduce meshing noises and vibrations of a crawler belt and a drive sprocket in an extremely reliable manner and over an extended period of time, while realizing a substantial cost reduction through simplification in construction.

In accordance with the present invention, the above-stated objective is achieved by the provision of a drive apparatus suitable for application to crawler type vehicles of the sort including a drive motor mounted on a vehicle frame for rotationally driving an output shaft, a power transmission mechanism coupled with the output shaft of the drive motor and having a rotatable cylindrical housing, a drive sprocket provided around the outer periphery of the transmission housing for rotation integrally therewith, and a crawler belt having a large number of track links in rows running along axially opposite sides of the drive sprocket, the track links in each row being connected into an endless form by connecting members interposed between the rows of track links.

According to a feature of the present invention, the drive apparatus is provided with an annular link guide member on the transmission housing for sliding contact with the track links of the crawler belt in such a diametrical position as to maintain a small clearance constantly between each connecting member of the crawler belt and a bottom of the drive sprocket when meshed with each other.

With the arrangements just described, as connecting members of the crawler belt are successively brought into meshing engagement with the drive sprocket, track links of the crawler belt are landed on the link guide member on the transmission housing in such a way as to maintain a small clearance constantly between the respective connecting members of the crawler belt and bottom of the drive sprocket. Accordingly, the annular link guide member functions to prevent the respective connecting members of the crawler belt from hitting directly against bottom of the drive sprocket, thereby preventing their meshing noises and vibrations which would otherwise be generated in a far louder level.

In this instance, according to the present invention, the link guide member can be located in such an axial position as to receive track links at least in one of the rows of track links running along axially opposite sides of the drive sprocket.

With the arrangements just described, as the respective connecting members of the crawler belt are successively brought into meshing engagement with the drive sprocket, the link guide member is held in sliding contact with at least track links in one of the rows of track links which are located in axially opposite sides of the drive sprocket to maintain a small clearance between each one of the connecting members of the crawler belt and bottom of the drive sprocket.

Further, according to the present invention, the annular link guide member may be provided respectively for each one of the rows of track links running along axially opposite sides of the drive sprocket.

With the arrangements just described, as the respective connecting members of the crawler belt are successively brought into meshing engagement with the drive sprocket, the link guide members are held in sliding contact with both of the rows of track links which are located in axially opposite sides of the drive sprocket to maintain a small clearance between each one of the connecting members of the crawler belt and bottom of the drive sprocket. Besides, in this case, the impacts of track links are dispersed to the two link guide members, adding to a benefit of prolonging the service life of the link guide members.

Further, according to the present invention, the above-described power transmission mechanism is constituted by reduction gear systems arranged to transmit rotation of large torque to the drive sprocket.

With the arrangements just described, by speed reductions through the reduction gear systems, rotation of large torque is transmitted from the drive motor to the sprocket which drives the crawler belt into crawling motions by successively with the connecting members of the said crawler belt.

Furthermore, according to the present invention, the crawler belt may be constituted by a large number of track links arranged in parallelly spaced rows running along axially opposite sides of the drive sprocket, cylindrical bushes interposed between the rows of track links, a large number of connecting pins inserted in the respective bushes to connect the track links and the rows of track links with each other, and shoes provided on the soles of respective track links. In this case, the bushes and the connecting pins constitute the afore-mentioned connecting members.

With the arrangements just described, the crawler belt is formed into an endless form by inserting connecting pins into bushes which are interposed between the parallelly spaced rows of track links. The crawler belt is driven into crawling motions as the drive sprocket is successively meshed with the connecting members, which are constituted by the respective bushes and connecting pins.

Further, according to the present invention, preferably the annular or circular link guide member is arranged in a diameter D in the relations of:

$$D > Ds + Db/2 - H$$

where Ds is the diameter of root circle of the drive sprocket, H is the distance between the center of track link and landing surface on the outer periphery of the link guide member, and Db is the diameter of bush.

With the arrangements just described, as the bushes of the crawler belt are successively brought into meshing engagement with the drive sprocket, the link guide member on the transmission housing is held in sliding contact with the track links, maintaining a small clearance constantly between each bush of the crawler belt and bottom of the drive sprocket when meshed with each other. As a result, the bushes of the crawler belt are prevented from directly hitting against root portions of the drive sprocket to suppress meshing noises and vibrations which would otherwise occur in a conspicuous way.

BRIEF DESCRIPTION OF THE DRAWINGS

The above and other objects, features and advantages of the invention will become apparent from the following particular description of the invention, taken in conjunction with the accompanying drawings which show by way of example some preferred embodiments of the invention and in which.

DESCRIPTION OF THE PREFERRED EMBODIMENTS

Figure 1:
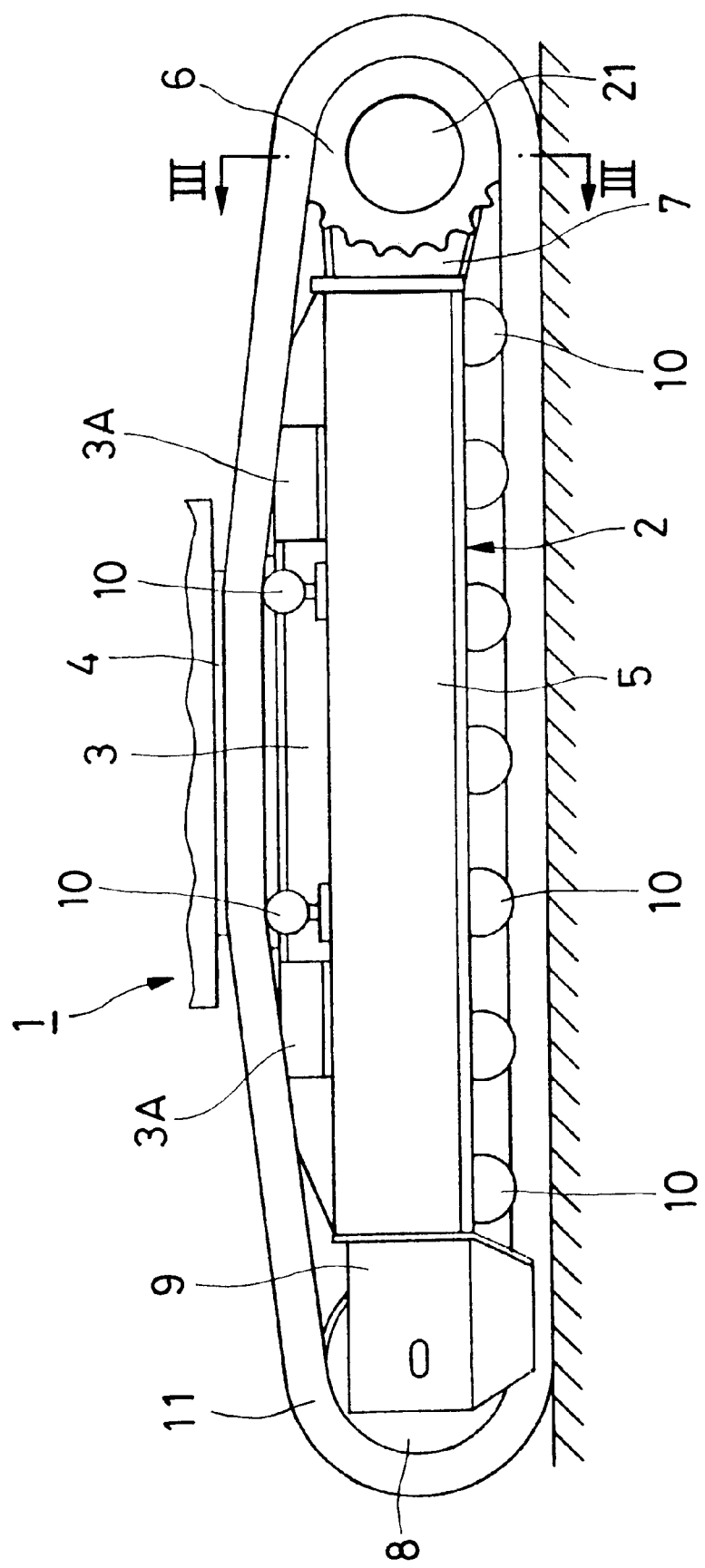
FIG. 1 is a schematic outer view of a first embodiment of the crawler type vehicle drive apparatus according to the present invention.

Hereafter, the invention is described more particularly by way of its preferred embodiments with reference to FIGS. 1 through 8.

Referring first to FIGS. 1 to 4, there is shown a first embodiment of the present invention, in which indicated at 1 is a base carrier of a hydraulic power shovel, and at 2 a truck frame of the base carrier 1. The truck frame 2 is mainly constituted by a center frame 3, an annular bearing support 4 mounted centrally on top of the center frame 3, and a pair of side frames 5 (only one of which is shown in the drawing) which are supported on end portions of leg portions 3A at the opposite lateral sides of the center frame 3 and extended in forward and rearward directions.

Indicated at 6 is a drive sprocket which is supported on one end of each side frame 5 through a bracket 7 and rotationally driven from a drive motor 16, which will be described later, to turn around a crawler belt 11 which will also be described hereinafter.

Denoted at 8 is an idler wheel which is supported on the other end of the side frame 5 through a bracket 9. By a crawler belt tensioning device (not shown) which is provided within the side frame 5, the idler wheel 8 is constantly biased in a direction away from the drive sprocket 6 to impart a suitable degree of tension to the crawler belt 11 which is wrapped between and around the drive sprocket 6 and idler wheels 8.

Indicated at 10 are a plural number of rollers which are rotatably mounted on the upper and lower sides of the side frame 5 to support the side frame 5 on the crawler belt 11 in cooperation with the drive sprocket 6 and idler wheels 8, while keeping the crawler belt 11 out of contact with the side frame 5.

Figure 2:
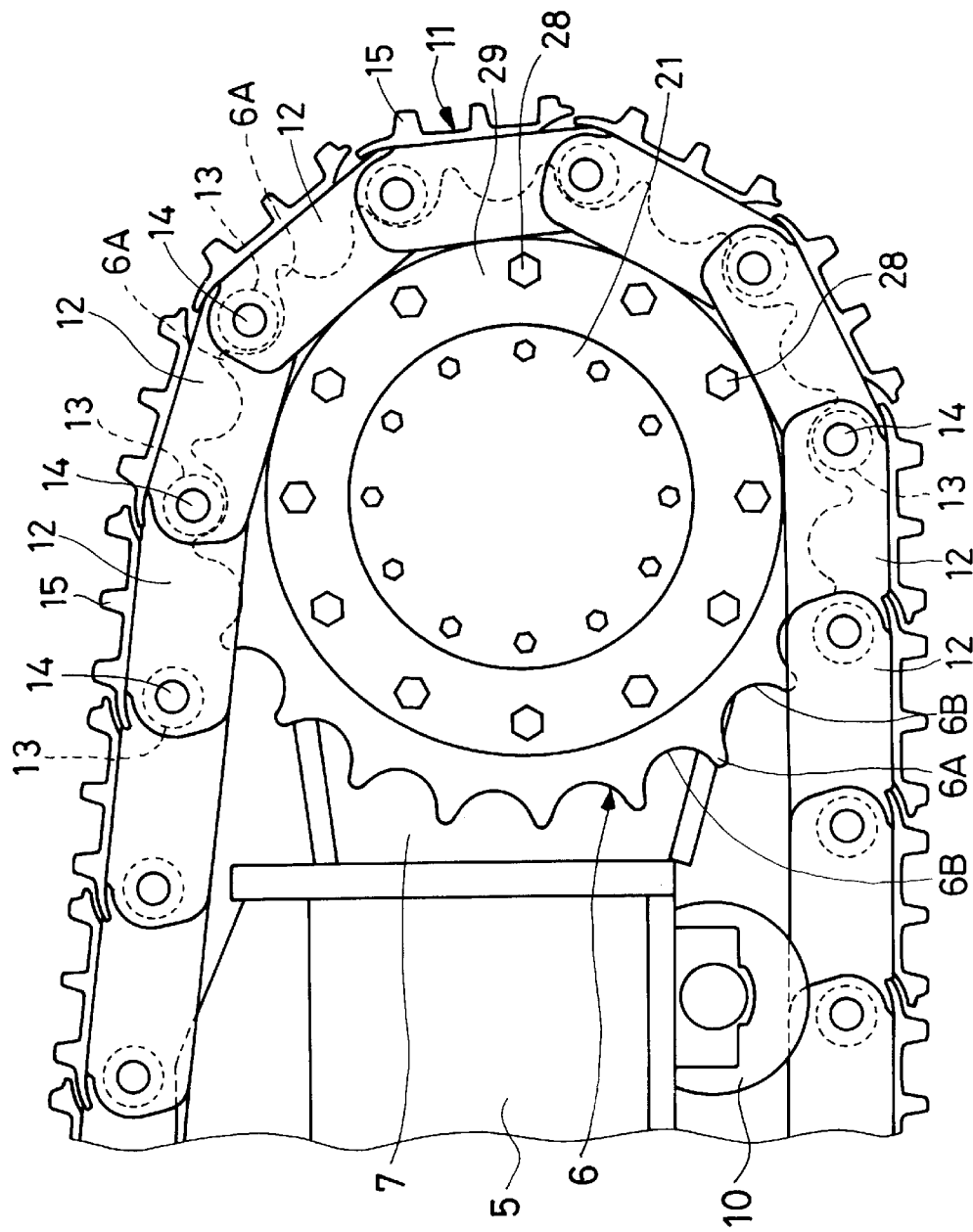
FIG. 2 is a side view on an enlarged scale of a drive sprocket shown in FIG. 1.
Figure 3:
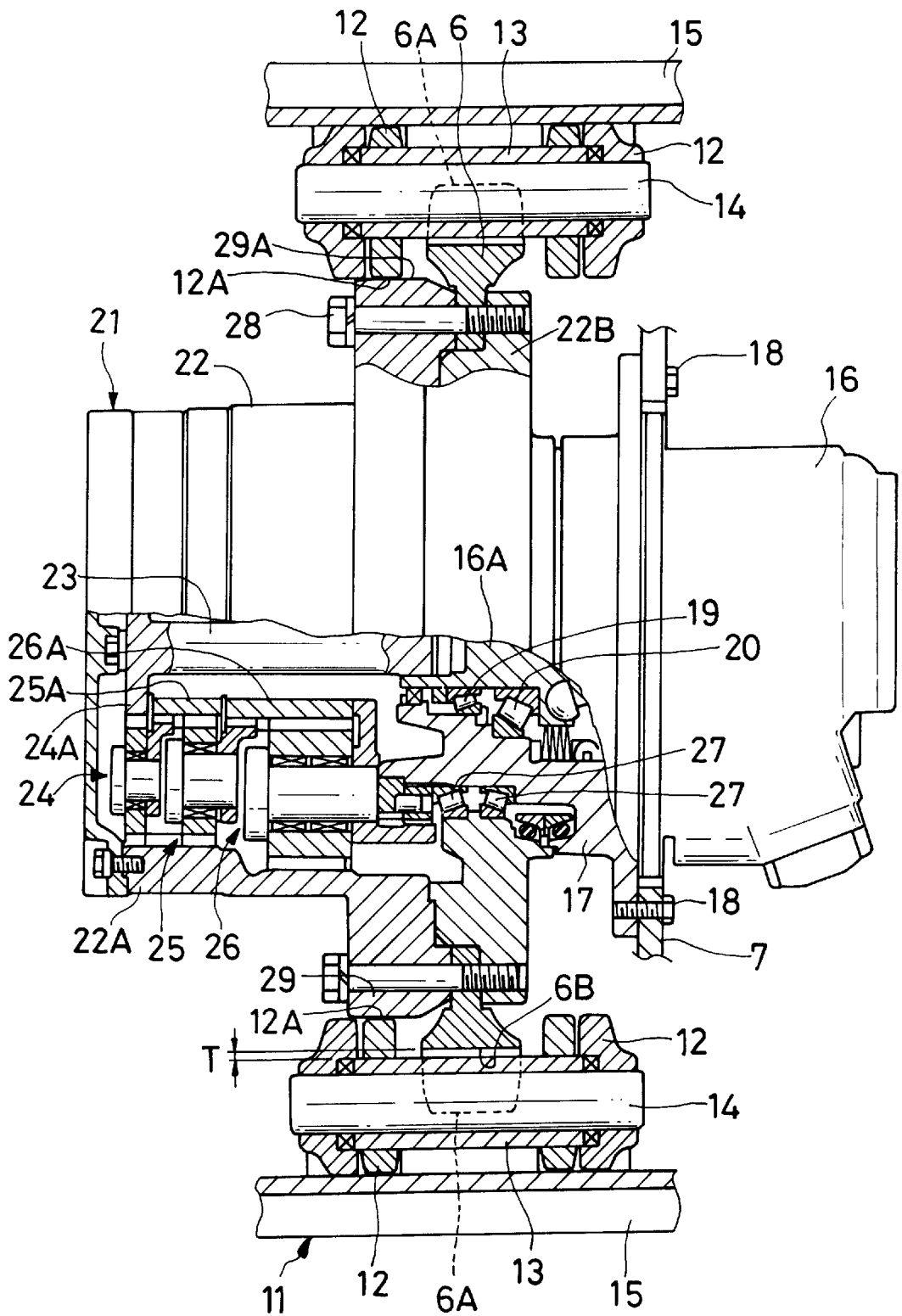
FIG. 3 is a schematic view of drive motor, reducer and crawler belt partly sectioned on line III—III of FIG. 1.

The reference numeral 11 indicates the crawler belt which is wrapped between and around the drive sprocket 6 and idler wheels 8, and, as shown particularly in FIGS. 2 and 3, constituted by rows of a large number of track links 12 which are laterally spaced apart in conformity with the axial width of the sprocket 6, cylindrical bushes 13 interposed between the rows of track links 12, connecting pins 14 fitted in the respective bushes 13 and connecting the track links 12 into an endless form, and plate-like shoes 15 securely fixed on the outer side of the respective track links 12.

The bushes 13, which engage between the teeth 6A of the drive sprocket 6, constitute connecting members along with the connecting pins 14 to connect the respective track links 12 to adjacent track links 12.

Indicated at 16 is a drive motor, e.g., a hydraulic motor or the like, which is mounted on one end of the side frame 5 for driving the sprocket 6. The drive motor 16 is provided with a stepped cylindrical casing 17 which is fixedly mounted on a bracket 7 of the side frame 5 by means of a plural number of bolts 18. Output shaft 16A of the drive motor 16 is rotatably supported within the inner periphery of the casing 17 through bearings 19 and 20, and coupled with an input shaft 23 of a reducer 21 which will be described below.

The reducer 21, serving as a power transmission mechanism, is coupled with the output shaft 16A of the drive motor 16 to transmit rotation of large torque to the drive sprocket 6 by reducing the speed of the drive motor 16.

In this instance, the reducer 21 is mainly constituted by a cylindrical housing 22, an input shaft 23 having its base end splined on the output shaft 16A of the drive motor 16, a first-stage planetary gear mechanism 24 including a solar gear 24A mounted on a fore end portion of the input shaft 23, a second-stage planetary gear mechanism 25 including a solar gear 25A rotated at a reduced speed by the first-stage planetary gear mechanism 24, and a third-stage planetary gear mechanism 26 including a solar gear 26A rotated at a further reduced by the second-stage planetary gear mechanism 25.

The housing 22 includes a lidded cylindrical main housing 22A which accommodates the planetary gear mechanisms 24 to 26, and a hollow disc-like rotary member 22B which is rotatably fitted on the outer periphery of the casing 17 through bearings 27 and securely fixed to an open end of the main housing 22A by bolts 28. The drive sprocket 6 is gripped and fixed in position between the main housing 22A and the rotary member 22B by the bolts 28.

Accordingly, rotation of the output shaft 16A of the drive motor 16 is transmitted to the housing 22 after speed reductions through the planetary gear mechanisms 24 to 26 of the reducer 21. Therefore, along with the housing 22, the drive sprocket 6 is put in low speed rotation to drive the crawler belt 11 with a large torque.

Designated at 29 is an annular link guide portion which is formed integrally with the main housing 22A in a radially projecting flange-like shape around the outer periphery of the open end of the main housing 22A. As shown particularly in FIGS. 2 and 3, the link guide portion 29 is formed in the shape of a thick annular wall concentrically with the drive sprocket 6 and has its outer peripheral surface 29A in sliding engagement with inner end faces 12A of track links 12 in one of the two laterally spaced rows of track links which are located along axially opposite sides of the drive sprocket 6 (with track links in a row at the left side of the sprocket in the drawings).

Figure 4:
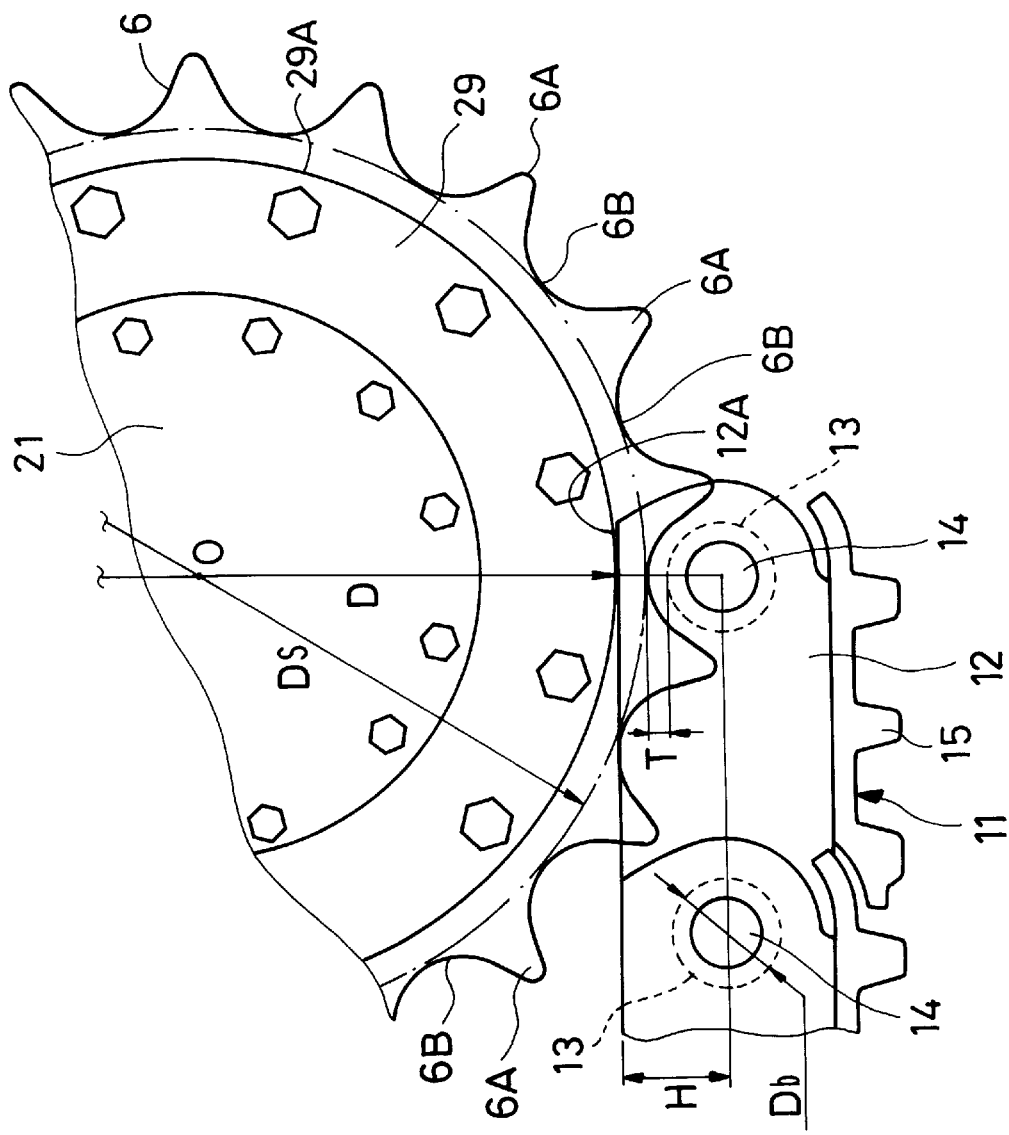
FIG. 4 is a schematic illustration explanatory of the manner in which a track link is landed on a link guide member.

In this case, as shown in FIG. 4, the annular link guide portion 29 is formed according to Formula 1 below, which defines the diameter D of the annular link guide portion 29 in relation with the diameter Ds of root circle of the drive sprocket 6 through its center O, the distance H from the center of the connecting pin 14 to the inner end face 12A of the track link 12, the diameter Db of the bush 13, and the width T of a clearance formed between the bottom 6B of the drive sprocket 6 and bushes 13 in meshed engagement with the drive sprocket 6.

[Formula 1]

$$D = Ds + Db/2 - H + T$$

Namely, the diameter D of the link guide portion 29 is determined to satisfy the conditions of the following formula 2.

[Formula 2]

$$D > Ds + Db/2 - H$$

Accordingly, in this instance, the link guide portion 29 is held in sliding contact with the inner end faces 12A of track links 12 in the left row in the drawing when the bushes 13 of the respective track links 12 of the crawler belt 11 are meshed with the teeth 6A of the drive sprocket 6. As a result, a narrow clearance T is formed between each bush 13 and the bottom 6B of the drive sprocket 6.

The present embodiment, with the arrangements as described above, operates in the manner as follows.

Upon starting the drive motor 16, its rotation is transmitted to the drive sprocket 6 through the reducer 21 to put the sprocket 6 in low speed rotation of large torque. As the drive sprocket 6 is put in rotation in this way, the teeth 6A of the sprocket 6 are successively brought into meshing engagement with the bushes 13 of the crawler belt 11, driving the crawler belt 11 to turn around to put the base carrier 1 of the vehicle in travel.

When the bushes 13 are successively meshed with the teeth 6A of the drive sprocket 6, the outer peripheral surface 29A of the annular link guide portion 29, which is provided on the housing 22 of the reducer 21, is constantly held in sliding contact with the inner end faces 12A of the track links 12 around the drive sprocket 6, in such a way as to maintain a small clearance T between the bottom 6B of the sprocket 6 and the bushes 13 as shown in FIGS. 3 and 4.

Consequently, when the drive sprocket 6 is put in rotation, tangentially acting forces of the respective teeth 6A of the sprocket 6 are exerted on the respective bushes 13 of the crawler belt 11, but normally acting forces of the sprocket teeth 6A are born by the annular link guide portion 29 on the housing 22. Therefore, the annular link guide portion 29 keeps the respective bushes 13 from directly hitting or abutting against the bottom 6B of the drive sprocket 6, thereby to reduce the meshing noises or vibrations to a marked degree.

In addition, the annular link guide portion 29 which is formed integrally on the housing 22 of the reducer 21 can maintain its effects over an extended period of time in suppressing the above-mentioned meshing noises or vibrations as compared with conventionally used rubber or similar buffer materials which are susceptible to abrasive wear relatively in an early stage of use.

Further, in comparison with the prior art using cylindrical buffer members for the respective ones of a large number of track links of the crawler belt, the track link guide according to the present invention contributes to reduce the number of parts as well as the number of steps in assembling processes to such a degree as will be reflected by a significant reduction in cost.

Figure 5:
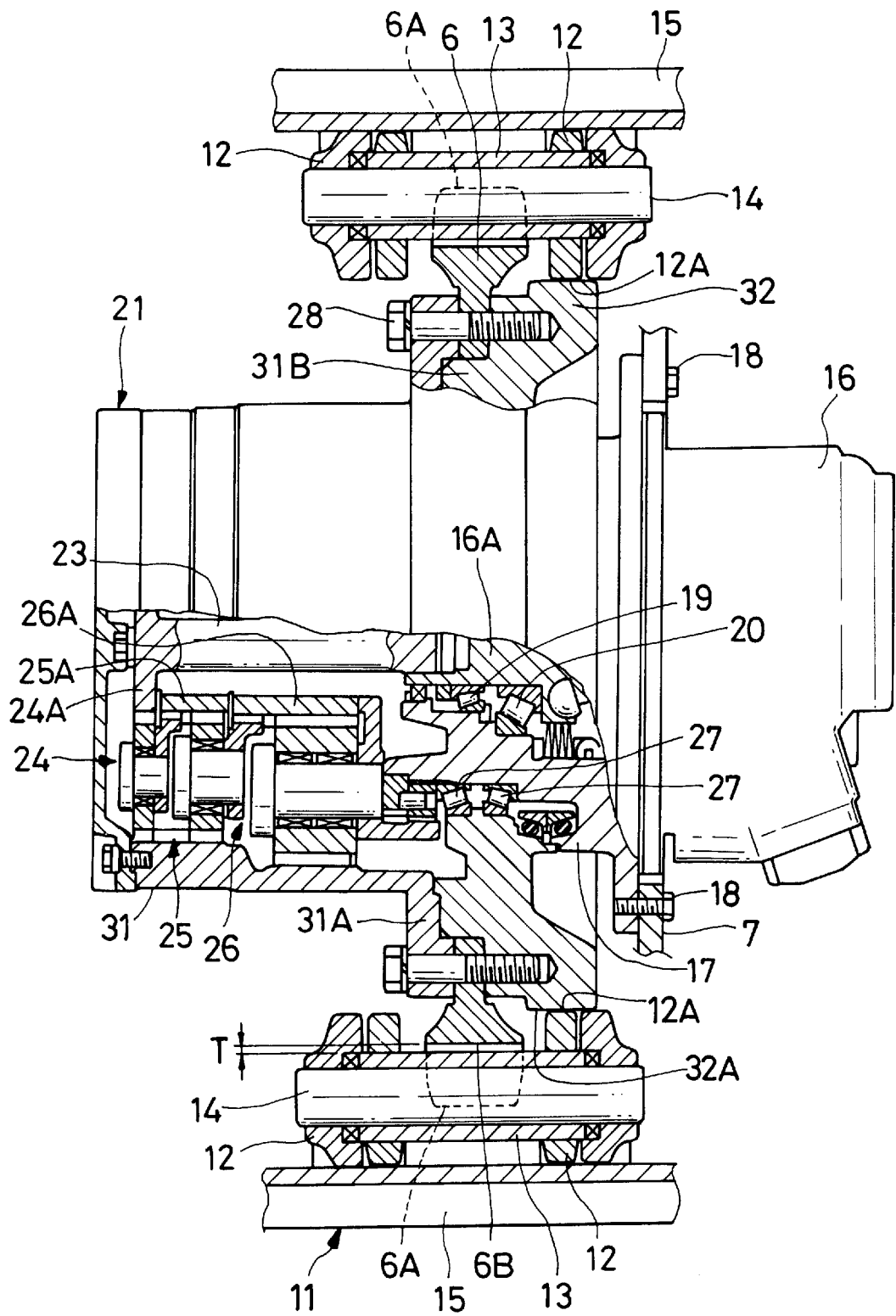
FIG. 5 is a view similar to FIG. 3 but showing drive motor, reducer and crawler belt in a second embodiment of present the invention.

Referring now to FIG. 5, there is shown a second embodiment of the present invention. In the following description of the second embodiment, the component parts which are common with the foregoing first embodiment are simply designated by common reference numerals without repeating same explanations.

In FIG. 5, indicated at 31 is a transmission housing which is employed in this embodiment for the reducer 21. Similarly to the housing 22 in the above-described first embodiment, the housing 31 is composed of a main housing 31A in the form of a lidded cylinder, and a hollow disk-like rotary member 31B which grips the drive sprocket 6 in position around the transmission housing in cooperation with the main housing 31A. The housing 31 differs from the housing 21 of the first embodiment in that it is provided an annular link guide portion 32 on the outer periphery of the rotary member 31B.

Indicated at 32 is the annular link guide portion which is formed in a substantial thickness around the outer periphery of the rotary member 31B of the housing 31 concentrically with the drive sprocket 6. The link guide portion 32 has its outer peripheral surface 32A in sliding contact with inner end faces 12A of track links 12 in the other one (the right side in the drawing) of the rows of track links 12 running along axially opposite ends of the drive sprocket 6.

In this instance, the link guide portion 32 is formed in the same diameter as the link guide portion 29 in the foregoing first embodiment. More specifically, the link guide portion 32 is formed in the diameter D according to Formula 1 above, relative to the root circle diameter Ds of the drive sprocket 6, distance H of the inner end face 12A of the track link 12 from the center of the connecting pin 14, and clearance T formed between the bottom 6B of the drive sprocket 6 and each one of the bushes 13 when in meshed state.

Namely, as the bushes 13 of the respective track links 12 of the crawler belt 11 are continuously brought into meshing engagement with the teeth 6A of the drive sprocket 6, the link guide portion 32 of this embodiment also functions to maintain a clearance T between each bush 13 and the bottom 6B of the drive sprocket 6.

Thus, in the present embodiment with the arrangements as described above, when the drive motor 16 is actuated to drive the bushes 13 of the crawler belt 11 successively into meshing engagement with the teeth 6A of the drive sprocket 6, the outer peripheral surface 32A of the link guide portion 32 on the rotary member 31B is constantly held in sliding contact with inner end faces 12A of the track links 12 in the right side of the track link rows around the drive sprocket 6. Consequently, the respective bushes 13 are spaced from the bottom 6B of the drive sprocket 6 by the clearance T.

Accordingly, when the drive sprocket 6 is put in rotation, tangentially acting forces of the teeth 6A of the drive sprocket 6 are exerted on the respective bushes 13 of the crawler belt 11, but normally acting forces of the sprocket teeth 6A are born by the annular link guide portion 32. Therefore, the annular link guide portion 32 prevents the bushes 13 from directly abutting against the bottom 6B of the drive sprocket 6, suppressing the meshing noises and vibrations of the crawler belt to a significant degree.

Figure 6:
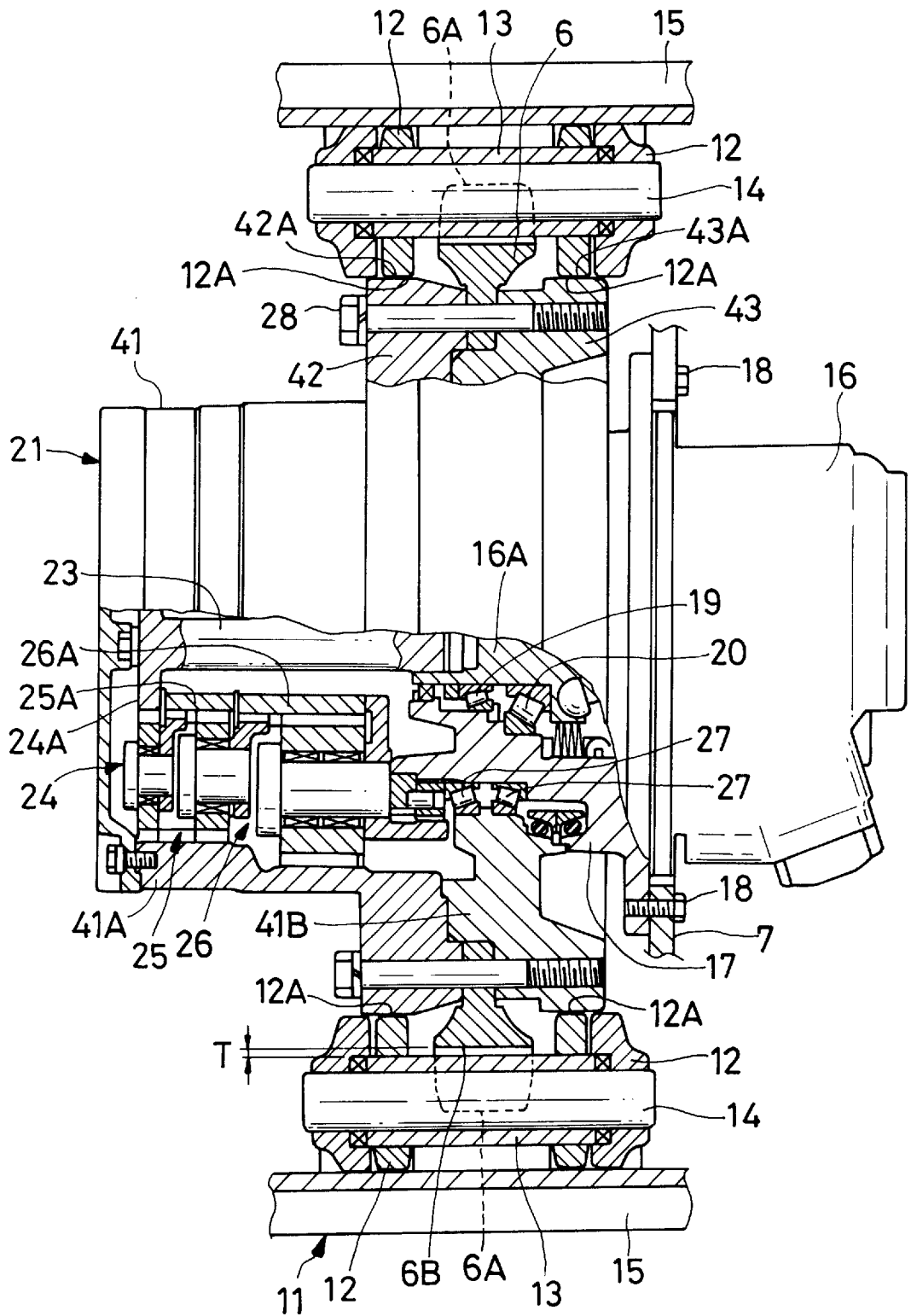
FIG. 6 is a view similar to FIG. 3 but showing drive motor, reducer and crawler belt in a third embodiment of the present invention.

Referring now to FIG. 6, there is shown a third embodiment of the present invention. In the following description of the third embodiment, the component parts which are common with the foregoing embodiments are simply designated by common reference numerals without repeating same descriptions.

In FIG. 6, indicated at 41 is a transmission housing employed in this embodiment. This housing 41 is composed of a main housing 41A in the form of a lidded cylinder, and a hollow disk-like rotary member 41B which grips the drive sprocket 6 in position in cooperation with the main housing 41A. In this embodiment, however, first and second link guide portions 42 and 43 are integrally formed on the main housing 41A and the rotary member 41B, respectively, as will be described below.

More specifically, indicated at 42 is a link guide portion in the form of a radially projecting thick annular flange which is formed integrally around the outer periphery of the main housing 41A at its open end and concentrically with the drive sprocket 6. The link guide portion 42 has its outer peripheral surface 42A in sliding contact with inner end faces 12A of the respective track links 12 in one (the left side in the drawing) of the rows of track links 12 of the crawler belt 11 running along axially opposite sides of the drive sprocket 6.

Denoted at 43 is the other link guide portion in the form of a relatively thick annular portion which is formed around the outer periphery of the rotary member 41B. This link guide portion 43 has an outer peripheral surface 43A for sliding engagement with inner end faces 12A of the respective track links 12 in the other one (the right side in the drawing) of the rows of track links 12 of the crawler belt 12 which are located in axially opposite positions on the drive sprocket 6.

In this case, the first and second link guide portions 42 and 43 are formed in a diameter D which is equivalent to that of the link guide portion 29 in the foregoing first embodiment. More specifically, the link guide portions 42 and 43 are formed in the diameter D according to Formula 1 given above, relative to the root circle diameter Ds of the drive sprocket 6, distance H from the center of the connecting pin 14 to the inner end face 12A of the track link 12, and width T of the clearance to be formed between the bottom 6B of the drive sprocket 6 and the bushes 13 when in meshed state.

According to this embodiment, with the arrangements just described, when the drive motor 16 is started to drive the bushes 13 of the respective track links 12 successively into meshing engagement with the teeth 6A of the drive sprocket 6, the outer peripheral surfaces 42A and 43A of the link guide portions 42 and 43 on the main housing 41A and the rotary member 41B are constantly held in sliding contact with the inner end faces 12A of track links 12 in both of the track link rows which run along axially opposite sides of the drive sprocket 6, maintaining a clearance T between each bush 13 and the bottom 6B of the drive sprocket 6.

As a result, tangentially acting forces of the respective teeth 6A of the rotating sprocket 6 are exerted on the respective bushes 13 of the crawler belt 11. However, normally acting forces of the respective sprocket teeth 6A are sustained by the annular guide portions 42 and 43. Consequently, the link guide portions jointly function to prevent the bushes 13 from directly hitting against the bottom 6B of the drive sprocket 6, suppressing their meshing noises and vibrations to a marked degree.

Besides, according to this embodiment, the inner end faces 12A of track links 12 in both of track link rows running along axially opposite sides of the drive sprocket 6 are supported on the outer peripheral surfaces 42A and 43A of the link guide portions 42 and 43, so that the impacts which are imposed on the respective link guide portions 42 and 43 by the track links 12 are suitably dispersed into the two link guide portions. It follows that the arrangements of this embodiment also contribute to prolong the service life of the link guide portions 42 and 43 and to maintain their effects over a further extended period of time in suppressing meshing noises and vibrations of the drive sprocket 6 and crawler belt 11.

Figure 7:
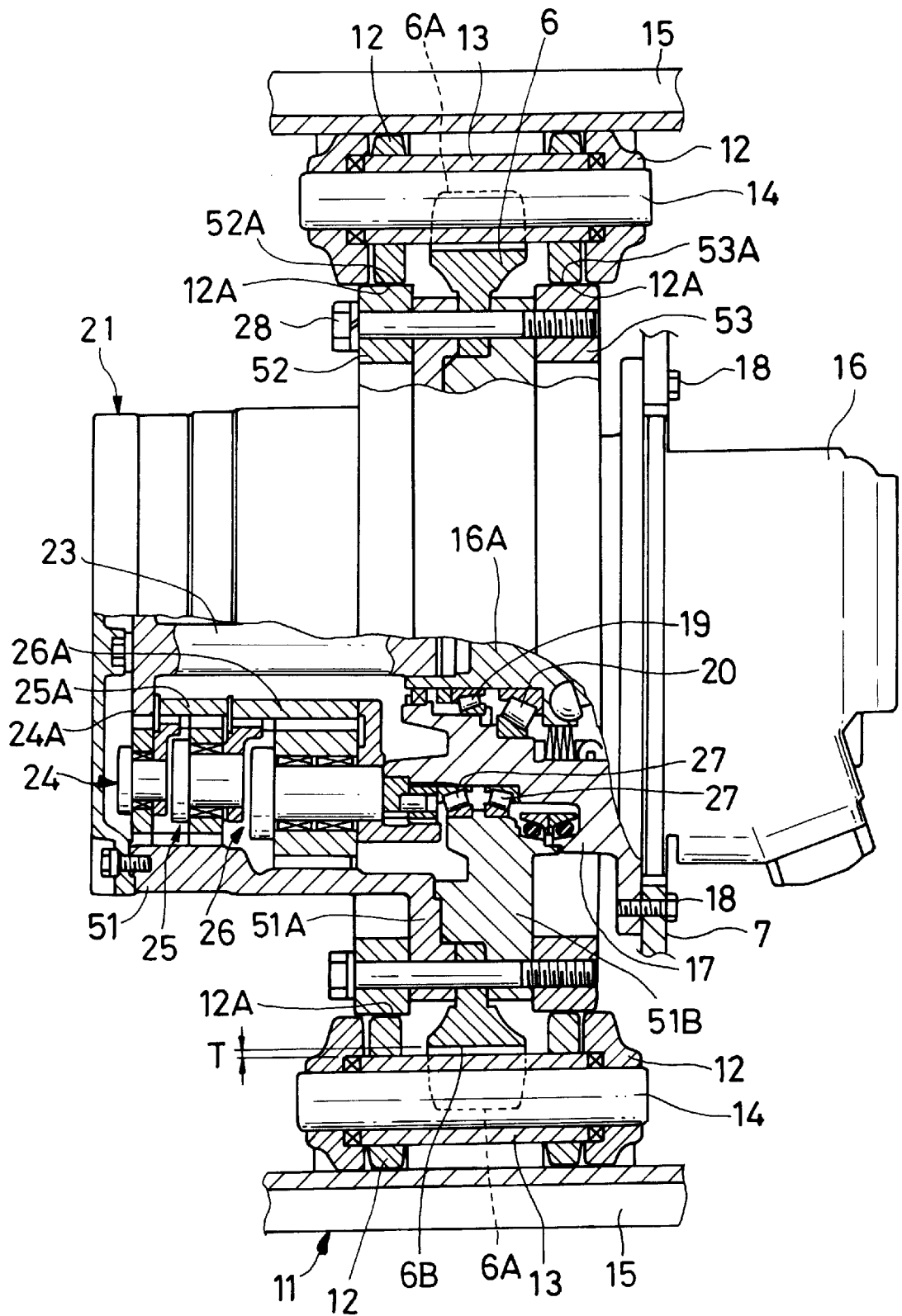
FIG. 7 is a view similar to FIG. 3 but showing drive motor, reducer and crawler belt in a fourth embodiment of the present invention.
Figure 8:
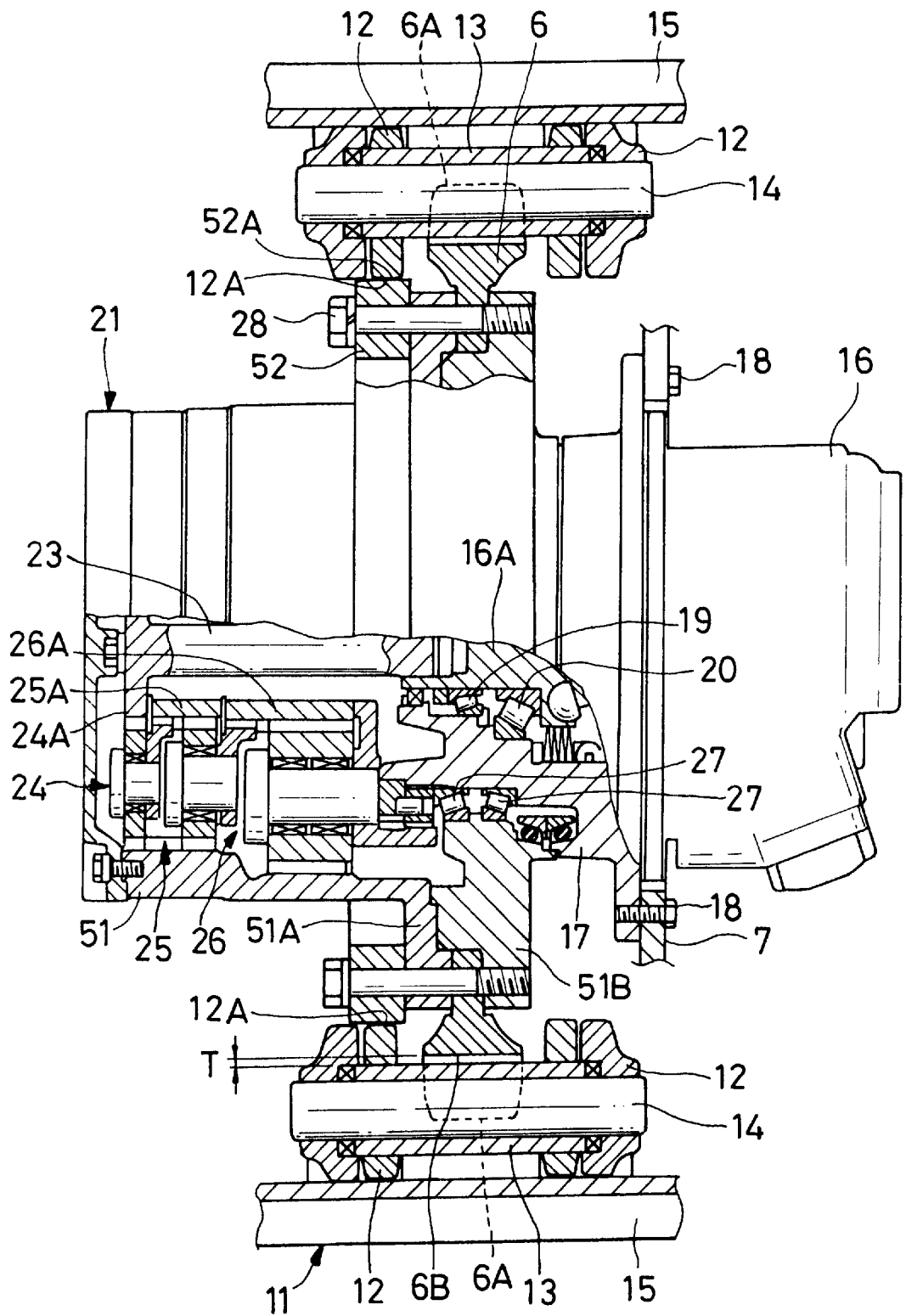
FIG. 8 is a view similar to FIG. 3 but showing a modification of the fourth embodiment.

Shown in FIG. 7 is a fourth embodiment of the present invention, wherein those component parts which are common with the foregoing embodiments are designated by common reference numerals to avoid repetitions of same explanations.

In FIG. 7, indicated at 51 is a transmission housing which is employed in this embodiment. Similarly to the housing 41 in the foregoing third embodiment, the transmission housing 51 is composed of a main housing 51A in the form of a lidded cylinder, and a hollow disk-like rotary member 51B which grips the drive sprocket 6 in position around the transmission housing in cooperation with the main housing 51A. In this embodiment, however, separate link guide rings 52 and 53 are fixed on the main housing 51A and the rotary member 51B as will be described below.

The reference numerals 52 and 53 denote the link guide rings which are fixed on the main housing 51A and the rotary member 51B of the transmission or reducer. Each one of these link guide rings 52 and 53 are in the shape of a ring of a relatively large diameter and formed of a metallic material with suitable rigidity. By means of bolts 28, the link guide rings 52 and 53 are fixed to the main housing 51A and rotary member 51B in such a manner as to sandwich meeting ends of the latter axially from opposite sides and concentrically with the drive sprocket 6. On outer peripheral surfaces 52A and 53A, the link guide rings 52 and 53 are held in sliding contact with inner end faces 12A of track links 12 in the rows of track links running along axially opposite sides of the drive sprocket 6, respectively.

In this case, both of the link guide rings 52 and 53 are formed in a diameter D which is equivalent to that of the link guide wall 29 in the foregoing first embodiment. More specifically, both of the link guide rings 52 and 53 are formed in a diameter D which satisfies the dimensional conditions of Formula 1 above relative to the root circle diameter Ds of the drive sprocket 6, distance H from the center of the connecting pin 14 to the inner end face 12A of the track link 12, and width T of the clearance to be formed between the bottom 6B of the drive sprocket 6 and the bushes 13 in meshed state.

Thus, even in this embodiment, when the drive motor 16 is started to drive the bushes 13 of the respective track links 12 of the crawler belt 11 successively into meshing engagement with the teeth 6A of the drive sprocket 6, the outer peripheral surfaces 52A and 53A of the link guide rings 52 and 53 on the main housing 51A and the rotary member 51B are constantly held in sliding contact with inner end faces 12A of the track links 12 in the rows of track links running along axially opposite sides of the drive sprocket 6, respectively, similarly maintaining a clearance T between each one of meshed bushes 13 and an bottom 6B of the drive sprocket 6.

As a result, tangentially acting forces of the teeth 6A of the rotating sprocket 6 are exerted on the respective bushes 13. However, normally acting forces of the sprocket teeth 6A are born by the respective link guide rings 52 and 53, which prevent the bushes 13 from directly hitting against bottom 6B of the drive sprocket 6. Accordingly, meshing noises or vibrations of the drive sprocket 6 and bushes 13 can be likewise suppressed to a marked degree.

Besides, according to this embodiment, the link guide rings 52 and 53 which are formed separately of the main housing 51A and rotary member 51B, can be provided without inviting any complication in construction of the housing 51, namely, contributing to a reduction in production cost.

In the fourth embodiment just described, the link guide rings 52 and 53 are arranged to sandwich between the main housing 51A and rotary member 51B of the transmission housing 51 axially from opposite sides. However, if desired, the link guide ring 52 alone may be provided on the part of the main housing 51A as shown in a modification of FIG. 8. In this instance, the link guide ring 52 is securely fastened to the main housing 51A concentrically with the drive sprocket 6 by means of a plural number of bolts 28 which are threaded into the rotary member 51B.

By arranging the link guide ring 52 in this manner, its outer peripheral surface 52A is constantly held in sliding contact with the inner end faces 12A of the track links 12 in the left one of the track link rows running along the drive sprocket 6, forming a clearance T between each bush 13 and the bottom 6B of the drive sprocket 6 in a manner similar to the foregoing first embodiment. Therefore, the link guide ring 52 prevents the respective bushes 13 from directly hitting against the bottom 6B of the drive sprocket 6, contributing to reduce their meshing noises and vibrations to a marked degree.

In the foregoing embodiments, the present invention has been described by way of a crawler type vehicle drive apparatus with crawler belts 11 which are each provided with a large numbers of track links separately from shoes 15, which are securely fixed to the respective track links by means of bolts. However, it is to be understood that the invention can be similarly applied to a crawler type vehicular drive apparatus with crawler belts which have shoes integrally with track links.

As clear from the foregoing detailed description, according to the present invention, an annular link guide member, which is provided around a housing of a power transmission mechanism, is held in sliding contact with track links of a crawler belt which is meshed with a drive sprocket, thereby forming a small clearance between each one of connecting members of the crawler belt and a bottom of the drive sprocket to prevent the connecting members of the crawler belt from directly hitting against bottom of the drive sprocket for suppression of meshing noises and vibrations of the crawler belt and the drive sprocket. In addition, the provision of the annular link guide member on a transmission housing contributes to reductions in cost and in the number of component parts or of the steps in assembling processes. Further, as compared with rubber or similar buffer material, the metallic link guide member is less susceptible to abrasive wear and can maintain the effects of suppressing noises and vibrations over a prolonged period of time.

Although the present invention has been described by way of its preferred embodiments, it is to be understood that various modifications or alterations can be added thereto without departing from the scope of the invention as defined in the appended claims.

What is claimed is:

1. In a crawler belt type vehicle including a drive motor mounted on a vehicle frame for rotationally driving an output shaft, a power transmission mechanism coupled with the output shaft of said drive motor and encased in a rotatable cylindrical housing, a drive sprocket provided around the outer periphery of said rotatable transmission housing for rotation therewith, and an endless crawler belt meshed with said drive sprocket, said crawler belt being constituted by a large number of track links connected in parallel spaced rows, cylindrical bushes interposed between said track links of said parallel spaced rows, a large number of connecting pins inserted in the respective bushes to connect said track links and said rows of track links with each other, and shoes provided on the respective track links, a crawler belt drive apparatus comprising:

an annular link guide member provided on said transmission housing for sliding contact with inner ends of said track links in such a diametrical position as to maintain a small clearance between said bushes and a bottom of said drive sprocket when meshed with each other, wherein said annular guide link member is arranged in a diameter D in the relations of:

$$D > Ds + Db/2 - H$$

where Ds is the root circle diameter of said drive sprocket, H is the distance between the center of track link and landing surface of said link guide member, and Db is the diameter of said bushes.

2. A crawler belt drive apparatus as defined in claim 1, wherein said link guide member is located in such an axial position as to receive track links at least on one of said rows of track links running along axially opposite sides of said drive sprocket.

3. A crawler belt drive apparatus as defined in claim 1, wherein said annular link guide member is provided for track links in each one of said rows of track links running along axially opposite sides of said drive sprocket.

4. A crawler belt drive apparatus as defined in claim 1 or 2, wherein said power transmission mechanism is constituted by reduction gear systems to transmit rotation of said drive motor to said drive sprocket after speed reductions.

* * * * *